Aug. 24, 1965     R. J. ROBINSON     3,202,827
PHOTOCELL FOR DETECTING LIMITED MOVING SHADOW AREAS
Filed June 29, 1961     2 Sheets-Sheet 1
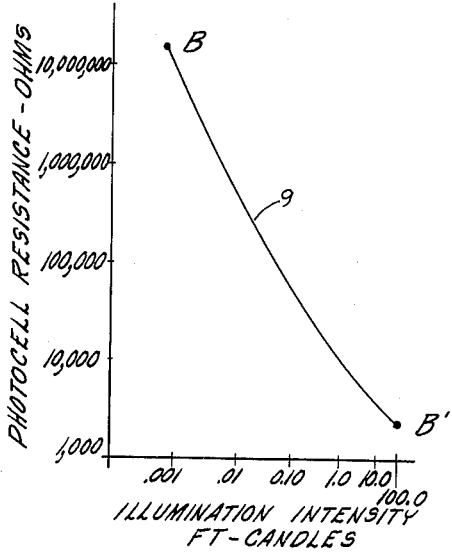
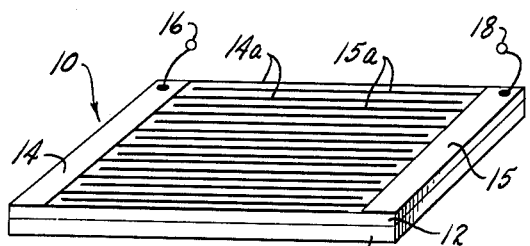
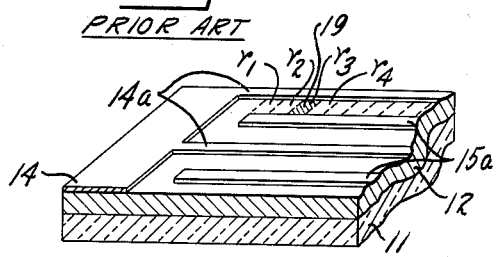
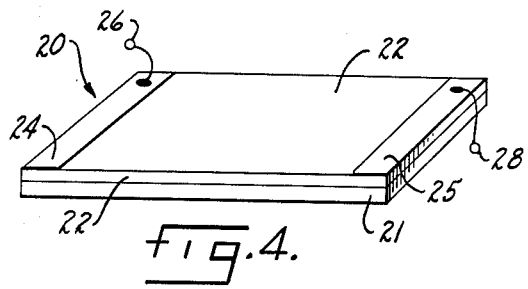
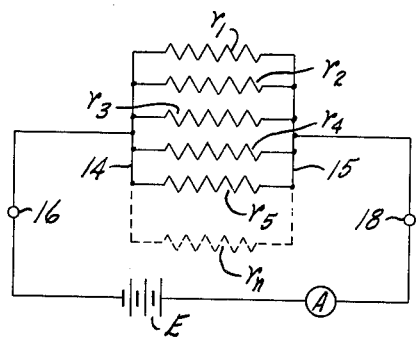
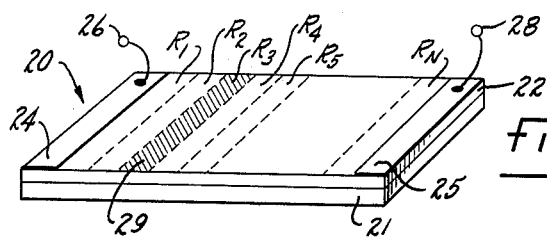
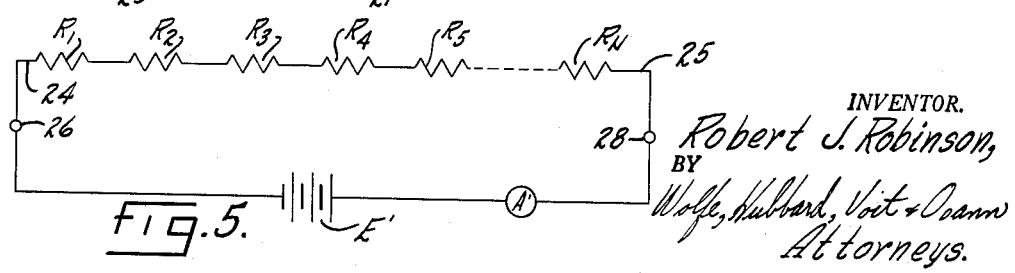
INVENTOR.
Robert J. Robinson,
BY Wolfe, Hubbard, Voit & Osann
Attorneys.

Aug. 24, 1965 R. J. ROBINSON 3,202,827
PHOTOCELL FOR DETECTING LIMITED MOVING SHADOW AREAS
Filed June 29, 1961 2 Sheets-Sheet 2

INVENTOR.
Robert J. Robinson,
BY
Wolfe, Hubbard, Voit & Osann
Attorneys.

United States Patent Office 3,202,827
Patented Aug. 24, 1965

3,202,827
PHOTOCELL FOR DETECTING LIMITED MOVING SHADOW AREAS
Robert J. Robinson, Chicago, Ill., assignor to Cummins-Chicago Corp., Chicago, Ill., a corporation of Illinois
Filed June 29, 1961, Ser. No. 120,565
4 Claims. (Cl. 250—219)

The present invention relates generally to photocells and, mort particularly, to photocells which are highly sensitive to changes in illumination over a portion of the photosensitive cell area.

In recent years, photocells have found wider and wider ranges of uses. For example, such cells have been used in switching devices which operate to automatically turn lights on at sunset and off at sunrise, i.e., the cells operate upon sensing a change in illumination intensity. Photocells have also been used in counting devices where the objects to be counted are passed between the cell and a light source. When the light source is blocked by the object, the resistance of a photoconductive cell, for example, abruptly increases, producing a momentary change in an output signal which is utilized to energize the counter. Photocells have also found widespread application in the field of business automation. In these applications, the cells are often utilized to sense the presence or absence of indicia, such as perforations or light reflective sports on a card, film, or other business document, which represent different characters.

In the exemplary prior art uses of photoconductive cells, the cells are designed to produce a change in an output signal in response to one of two conditions. First, should the intensity of the light source change, the electrical resistance of the cell will change inversely with respect thereto. Thus, as the intensity of the illumination increases, cell resistance decreases and, as the intensity of the illumination decreases, cell resistance increases. This may be termed "proportional" signalling. Secondly, photoconductive cells are designed to produce a change in output signal between two levels as light is transmitted to, or kept from, the cell. This may be termed an "on-off" or "switching" type operation.

It is a general aim of the present invention to provide an improved photocell which will produce a very marked change in an output signal derived therefrom when the cell is subjected to either uniform or nonuniform changes in incident absorbable radiation. In this connection, it is a general object of the invention to provide a photocell which is extremely sensitive to the presence of a shadow of limited area.

More specifically, an object of the invention is to provide a photocell characterized by its ability to detect the presence of only a thin line of darkness, as compared to full area illumination, and to produce a useful change in its output signal for each line of darkness sensed. Stated another way, it is an object of the invention to provide a signal generating system including a photocell extremely sensitive to changes in the uniformity of incident absorbable radiation.

It is another object of the invention to provide an improved photocell characterized by its ability to generate a useful change in output signal when subjected to a linear shadow of limited area and which is capable of generating such signal change even though the object producing the shadow is angularly related to the opposed cell electrodes.

Still another object of the invention is to provide an improved photocell which produces output signal changes of considerably greater amplitude than can be achieved with conventional photocells, thus enabling the use of less expensive detecting equipment.

A further object of the invention is to provide an improved photocell characterized by its ability to respond immediately to the presence of a relatively moving shadow and which does not have to be entirely darkened to produce a useful change in its output signal.

In another of its aspects, it is an object of the invention to provide an indicia detecting and signal generating apparatus responsive to the presence of a limited area shadow.

These and other objects and advantages of the invention are attained by the construction and arrangement to an exemplary embodiment of the invention as shown in the accompanying drawings, in which:

FIGURE 1 is a graph illustrating the variations in over-all cell resistance of a typical photocell as the intensity of illumination incident thereon takes on different values;

FIG. 2 is a perspective view illustrating the construcion of a typical prior art photoconductive cell;

FIG. 2a is an enlarged perspective view of a portion of the conventional photoconductive cell shown in FIG. 2;

FIG. 3 is a schematic diagram of an equivalent circuit which in part represents by analogy the conventional photoconductive cell of FIG. 2;

FIG. 4 is a perspective view illustrating the construction of a novel photoconductive cell embodying the features of the present invention;

FIG. 4a is a view similar to FIG. 4 illustrating particularly the disposition of the photosensitive material from an electrical standpoint;

FIG. 5 is a schematic diagram of an equivalent circuit which in part represents by analogy the photoconductive cell of FIG. 4; and, FIG. 6 is a diagrammatic view of an exemplary indicia sensing apparatus embodying the features of the present invention.

Figure 6:
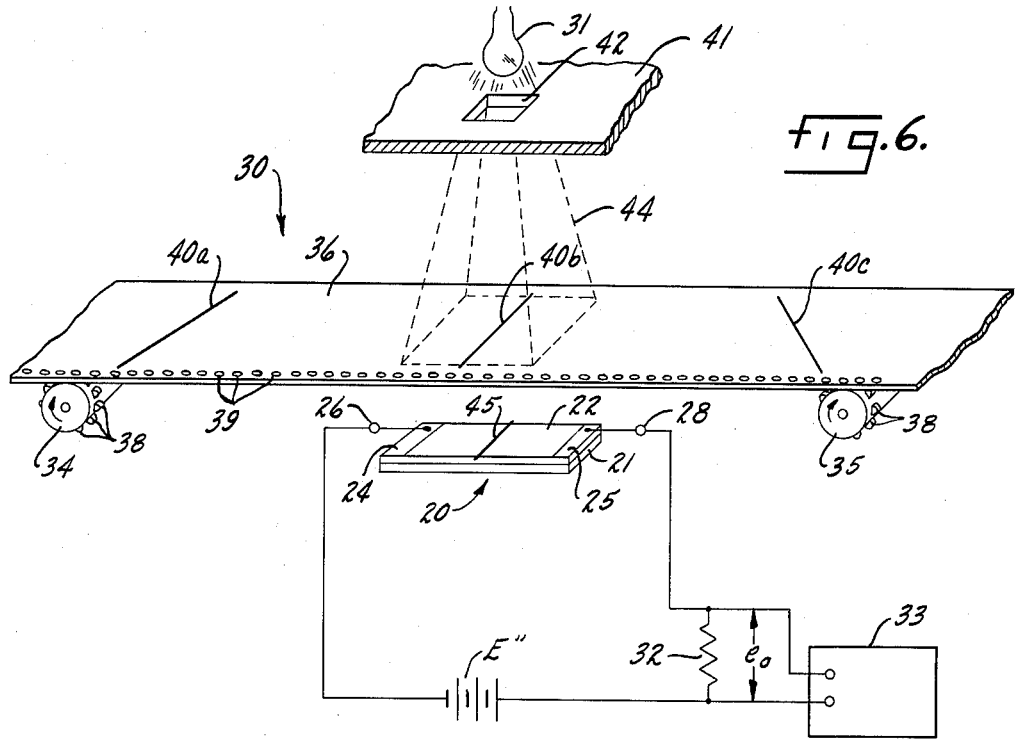

While the present invention is susceptible of various modifications and alternative constructions, an illustrative embodiment is shown in the drawings and will herein be described in detail. It should be understood, however, that it is not intended to limit the invention to the particu form disclosed, but on the contrary, the intention is to cover all modifications, equivalents and alternative constructions falling within the spirit and scope of the invention as expressed in the appended claims.

Referring first to FIG. 1, the values of over-all resistance of a typical photoconductive cell as different intensities of illumination are supplied thereto is illustrated by a curve or graph 9. As will be understood by those skilled in the art, such cells generally include a film or layer of photoconductive material, the electrical resistance of which changes when the entire exposed area thereof is uniformly subjected to incident absorbable radiation of varying intensity, or when the cells are subjected to partial area illumination, i.e., a narrow line of light. When a voltage applied across the photoconductive material, the current flow through the latter varies with the intensity of incident light or radiation. When the photoconductive material is illuminated by incident radiation, i.e., when the surface of the material is struck by photons, additional charge carriers are produced in the material. The additional carriers cause increased current flow through the material for a given voltage applied across it, thereby reducing its resistance. Under steady-state illumination conditions, these additional charge carriers recombine at a rate equal to the rate at which they are produced. However, as the intensity of the incident radiation increases, more and more photons strike the photoconductive material, thus further decreasing the over-all resistance (from point B towards point B' in FIG. 1). Stated another way, the rate of propagation of charge carriers exceeds the rate of recombination, thus increasing current flow through the cell. Conversely, as the intensity of the incident radiation decreases, fewer photons strike the photoconductive material and the over-all cell resistance increases (from point B' towards point B in FIG. 1).

Turning now to FIG. 2, there is illustrated a photoconductive cell 10 of the type conventionally employed in the prior art. Such a cell includes a nonconductive supporting layer or substrate 11, which, for example, may be glass. Superimposed on the nonconductive substrate is a film or layer of photoconductive material 12, which, for example, may be cadmium sulphide, cadmium selenide or cadmium telluride. A pair of spaced metallic electrodes 14, 15 are formed on the upper surface of the photoconductive material 12 and are respectively provided with terminals 16, 18 suitable for connecting the cell 10 to a voltage source. While the metallic electrodes 14, 15 may be made of various materials, it has been found that certain materials are preferable inasmuch as they are less likely to produce spurious signals or "noise" variations. Accordingly, in order to minimize the noise level and to prevent spurious signals, the electrodes 14, 15 are preferably ohmic, or nearly ohmic, and for example, may be made of indium.

In order to increase the sensitivity of the cell 10 or to make the cell applicable for use with a broad light source, the electrodes 14, 15 are respectively provided with sets of interlaced fingers 14a, 15a, which extend towards, but terminate short of, the opposed electrode. Thus, the electrodes and their associated fingers define a substantially continuous, zig-zag path on the photoconductive material which is exposed to incident radiation and which is confined to a relatively narrow area between opposed pairs of electrode fingers.

As most clearly illustrated in FIG. 2a, the zig-zag portion of exposed photoconductive material 12 intermediate the opposed electrode fingers 14a, 15a can be considered to be composed of a plurality of small segments $r_1$ through $r_n$ of photoconductive material, with each segment having a like resistance and with the segments disposed in parallel relationship between the electrode fingers. The practical effect of such prior art photoconductive cell construction is to increase the sensitivity of the cell 10 to changes in illumination intensity which occur uniformly over the entire inter-electrode cell area, while making the cell insensitive to shadows which occur over only a portion of the inter-electrode cell area, i.e., nonuniform changes in intensity. This result is most easily understood by reference to FIG. 3 which depicts diagrammatically an equivalent electrical circuit which is in part analogous to the photoconductive cell 10.

As shown in FIG. 3, the photoconductive cell 10 comprises a plurality of resistances $r_1$ through $r_n$ disposed in parallel between the electrodes 14, 15. The electrode terminals 16, 18 are connected across a suitable voltage source, here shown as a battery E, and through a current measuring or indicating means such as an ammeter A. In such an arrangement, the equivalent resistance $r_{eq}$ of the circuit (the over-all resistance of the cell 10) is determined by the equation (1) $$\frac{1}{r_{eq}} = \frac{1}{r_1} + \frac{1}{r_2} + \frac{1}{r_3} \cdots + \frac{1}{r_n}$$

where $n$ equals the total number of segments. Let it be assumed, for example, that the cell 10 is normally exposed to a constant light source of uniform intensity and that the light source is suddenly turned off, or the intensity is decreased uniformly over the entire inter-electrode cell area. In this instance the value of each of the resistances $r_1$ through $r_n$ increases (as shown in FIG. 1) with a resulting appreciable increase in the over-all resistance $r_{eq}$ of the cell. Thus, a change in signal, i.e., a decrease in current flow as displayed by the ammeter A, is generated in response to the change or decrease in illumination intensity.

Consider next what happens when the illumination intensity is changed nonuniformly over the inter-electrode cell area, i.e., a limited area shadow 19 (FIG. 2a) is cast upon a relatively small percentage of the exposed surface of photoconductive material. Let it be assumed, for example, that the limited area shadow 19 covers only $\frac{1}{100}$ of the photosensitive cell area, i.e., $n$ in Equation 1 is equal to 100. If $r_{eq}$ is equal to 1,000 ohms when the cell 10 is subjected to light of uniform intensity, then each resistance segment $r_1$ through $r_n$ (where $r_n$ is $r_{100}$) has an ohmic value of 100,000 ohms. When the limited area shadow 19 is impressed upon the cell 10, the resistance of the darkened segment (segment $r_3$ in the illustrative case) will immediately increase (as shown in FIG. 1). However, the remaining segments will each remain at an ohmic value of 100,000 ohms. If the resistance of the darkened segments $r_3$ increases by a factor of 1,000 then, substituting in Equation 1

$$\frac{1}{r_{eq}} = 99 \frac{(1)}{100,000} + \frac{1}{1,000\ (100,000)} \cong \frac{1}{1,010}$$

and the increased value of $r_{eq}$ is approximately 1,010 ohms. Thus, it is apparent that the limited area shadow 19 increases the effective resistance $r_{eq}$ of the cell 10 by only ten ohms, or an increase of only approximately 1 percent. It will be appreciated from the foregoing example that the photoconductive cell 10 is suitable only for use in detecting changes in illumination intensity which occur uniformly over the inter-electrode cell area, or to partial area lighting, i.e., the major portion of the photosensitive area remains darkened. However, partial area darkening will not produce a sufficient change in cell resistance or current flow to be reliably detected or measured except by very sensitive and expensive instruments.

While the photoconductive cell exemplified by FIGS. 2 and 3 is typical of the cells generally known in the prior art, not all prior art photoconductive cells employed interlaced electrode fingers. However, as will be realized by those skilled in the art, cells not employing opposed interlaced electrode fingers have been designed for use in specialized applications where the light source is narrow and the cell is subjected to changes in intensity of absorbed radiation uniformly over the inter-electrode cell area. In such cells, which are generally intended to generate an output signal change only when the exposed photoconductive material is totally darkened, illuminated, or otherwise senses a change in illumination intensity uniformly over the inter-electrode area, the electrodes are placed close together leaving only a very narrow band of exposed photoconductive material. In this manner, provision is made for insuring that the incident absorbed radiation covers the entire inter-electrode surface of photoconductive material, i.e., the cells are subjected to uniform illumination intensity.

In accordance with one of the important aspects of the present invention, there is provided a novel photocell construction wherein the cell is not only responsive to uniform changes in illumination intensity, but is also extremely sensitive to changes which occur nonuniformly over the exposed photosensitive material, that is, when the cell is subjected to partial area darkening. In the exemplary embodiment this is accomplished by providing an elongated photoconductive cell 20 (FIG. 4) having a novel electrode configuration such that the inter-electrode area may be considered to be composed of a plurality of small segments of photoconductive material arranged in series relationship.

In forming the cell 20 of the present invention, there is provided a nonconductive substrate 21 similar to the substrate 11 described for the photoconductive cell 10 in FIG. 2. Superimposed on the nonconductive substrate 21 is a film or layer 22 of photoconductive material such as cadmium sulphide, cadmium selenide, or cadmium telluride. However, the photoconductive cell 20, unlike the cell 10, employs a pair of electrodes 24, 25 which are spaced relatively far apart so as to insure a broad band of exposed photoconductive material intermediate the electrodes. The electrodes 24, 25 are respectively provided with terminals 26, 28 suitable for connecting the cell 20 to a voltage source.

As most clearly illustrated in FIG. 4a, the broad band of photoconductive material 22 which is exposed to incident radiation may be considered to be composed of a plurality of small segments $R_1$ through $R_N$, with each segment having a like resistance when exposed to uniform radiation and with the segments disposed in series between the electrodes 24, 25. In this manner, the cell 20 is made extremely sensitive to the presence of limited area shadows which produce nonuniform interelectrode changes in illumination intensity, as is most clearly understood by reference to FIG. 5, wherein an equivalent electrical circuit in part analogous to the photoconductive cell 20 is shown. Thus, the cell 20 can be considered equivalent to an electrical circuit having a plurality of small resistances $R_1$ through $R_N$ which are serially connected between a pair of electrodes 24, 25 having terminals 26, 28. In use, the latter terminals are connected across a suitable voltage source, here shown as a battery $E'$. In this arrangement, the equivalent resistance $R_{eq}$ of the circuit (the over-all resistance of the cell 20) is determined by the equation (2) $\quad R_{eq} = R_1 + R_2 + R_3 \ldots + R_N$ where N equals the total number of segments. Let it be assumed that the same exemplary conditions exist as heretofore set forth in connection with the operation of the conventional photoconductive cell 10. Thus, when the cell 20 is exposed to a constant uniform source of illumination, and the illumination source is then extinguished or masked so that the incident light intensity is decreased uniformly throughout the inter-electrode area, the ohmic value of each of the resistances $R_1$ through $R_N$ will increase, thereby increasing the over-all cell resistance $R_{eq}$. This large increase in resistance reduces the current flow in the circuit of FIG. 5, so that a series-connected ammeter $A'$ will display a much lower reading.

Consider now what happens as the cell 20 is exposed to a nonuniform change in illumination intensity over the inter-electrode area, for example, to a limited area shadow 29 (FIG. 4a) which covers only 1/100 of the exposed surface of photoconductive material 22. If in Equation 2 it is assumed that $N=100$ and that $R_{eq}$ is equal to 1,000 ohms (the same exemplary values previously assigned to $r_{eq}$) when the inter-electrode area of the cell 20 is subjected to light of uniform intensity, then, each resistance segment $R_1$ through $R_N = R_{100}$) has an ohmic value of 10 ohms. When the limited area shadow 29 is impressed upon the cell 20, the resistance of the darkened segment (segment $R_3$ in the illustrative case) will immediately increase (as shown in FIG. 1). However, the remaining segments will remain at an ohmic value of 10 ohms. Thus, if the resistance of the darkened segment $R_3$ increases by a factor of 1,000, then, substituting in Equation 2

$R_{eq} = 99(10) + 1,000(10) = 10,990$ ohms

It will be apparent, therefore, that the limited area shadow 29 increases the effective resistance $R_{eq}$ of the cell 20 by 9,990 ohms, or an increase of 999 percent.

The current reading of the ammeter $A'$ will similarly decrease by a factor of 999 percent. This large change in resistance and in the output signal (current flow) is readily detected by relatively rugged and inexpensive instruments or circuits.

In order to obtain the results described above, it is only necessary to properly orient the cell 20 with respect to the limited area shadow being detected such that any linear component of the shadow will cut entirely across the exposed photoconductive material 22 at some point intermediate the electrodes, thus entirely darkening one series segment $R_N$.

Since the exemplary cell 20 of FIG. 4 produces signal changes of considerably greater amplitude than do conventional prior art photocells such as that typified by the cell 10 of FIG. 2 (for example, under the given set of conditions set forth above the cell 20 exhibits a change of 999 percent in output signal as opposed to only 1 percent for the cell 10), the cell 20 is therefore readily adaptable to a different range of uses than is the cell 10. It will be appreciated that both cells can be subjected to four different types of changes in illumination intensity; (a) the cells may be totally darkened, (b) the cells may be totally illuminated, (c) the cells may be subjected to partial area darkening, and (d) the cells may be subjected to partial area illumination. While the conventional prior art cells produce useful changes in output signals under conditions (a), (b) and (d), a photocell 20 embodying the features of the present invention produces a useful change in output signal under conditions (a), (b) and (c).

A typical detecting and signal generating apparatus 30 embodying the features of the present invention is shown in FIG. 6. In the exemplary apparatus 30, an elongated photoconductive cell 20 having electrodes 24, 25 spaced relatively far from one another is disposed beneath a light source 31. The electrode terminals 26, 28 are connected to a voltage source, here shown as a battery $E''$, through a load resistor 32. A voltage-sensitive utilization device 33 is connected across the load resistor and may take any one of a variety of forms, for example, an amplifier connected to supply input signals to a counter, an oscilloscope, or other similar apparatus. The detecting and signal generating apparatus 30 is so arranged that uninterrupted light impinging upon the photoconductive material 22 from the light source 31 will cause substantially constant current flow through the load resistor 32 and so that the output voltage $e_0$ appearing thereacross has a relatively high, steady value. Should the light source 31 be extinguished or should the radiation emanating therefrom be blocked so that the cell 20 is either entirely darkened or is subjected to a shadow producing changes in illumination intensity which occur either uniformly or nonuniformly throughout the exposed inter-electrode area, the resistance of the cell 20 will abruptly increase to a large degree, thereby creating decreased current flow in the circuit and markedly reducing the output voltage $e_0$. This reduction in output voltage is sensed by the utilization device 33, so that the latter produces a response which is indicative that a decrease in incident light has occurred.

In carrying out the invention, provision is made for transporting the object or indicia representing line which produces a limited area shadow between the light source 31 and the cell 20 so as to disrupt the uniformity of the illumination received by the cell. In the exemplary form of the invention illustrated in FIG. 6, this is accomplished by mounting a pair of sprockets 34, 35 in the apparatus 30 in positions to transport a transparent carrier tape or film 36 between the light source 31 and the cell 20. One or both of the sprockets are provided with radially projecting teeth 38 for engagement with sprocket holes 39 formed in the film. Suitable drive means (not shown) are provided for driving the sprockets so as to advance the film 36.

Of course, it will be appreciated that the present invention is not limited to an apparatus for transporting film. On the contrary, the indicia to be detected can be carried by a wide variety of materials suitable for transmitting light, for example, checks or other sheets of paper. In such instances, the transporting mechanism utilized would be one suitable for advancing the particular indicia or object carrier.

In the exemplary apparatus of FIG. 6, the carrier film 36 has formed thereon a plurality of opaque lines (three such lines 40a–40c being shown) with the presence or absence of a line at a particular point on the film being indicative of a particular set of circumstances in accordance with any preselected code. Merely by way of example, the lines 40a–40c might be marks applied to the film by an assembly-line worker in a manufacturing operation each time that a repetitive manufacturing step is performed. In this example the utilization device 33 might be simply a counter for determining the number of times the repetitive manufacturing step is performed.

In order to increase the sensitivity of the apparatus 30, the light source 31 is positioned behind a light baffle 41 having an aperture 42 formed therein suitable for directing a beam of light 44 towards the carrier film 36 and cell 20. As the film 36 advances, the lines 40a–40c are successively moved through the light beam 44, thereby creating a linear shadow 45 which cuts entirely across the photoconductive material 22 of the cell 20 in the exposed area intermediate the electrodes 24, 25. At the instant that the shadow 45 first cuts across the photoconductive material 22, the resistance of the cell abruptly increases and remains at its increased level until the shadow 45 has completely traversed the cell.

It will be evident from the foregoing that cell 20 (FIG. 4) has a considerably faster response time than does the cell 10 (FIG. 2) when used to detect the presence of a shadow moving relative to the cell. For example, if the shadow 45 is of sufficient area to entirely black out the exposed photoconductive material, the cell 20 will allow a significant signal change to be generated at the instant the leading edge of the shadow cuts across the photoconductive material 22. The cell 10, on the other hand, will not respond immediately since a substantial portion of its exposed photoconductive material 12 must be darkened to produce a useful change in output signal. Moreover, the signal change generated with the apparatus shown in FIG. 6 will be of longer duration than would be a signal change generated by similar apparatus employing a cell 10 of the type shown in FIG. 2.

Another important feature of the present invention resides in the fact that the photoconductive cell 20 will operate with substantially equal efficiency when detecting linear shadows that are angularly related to the electrodes. Referring to FIG. 6, for example, it will be noted that while the shadow 45 produced by the opaque 40b lies in a plane parallel to the electrodes 24, 25, the corresponding shadows produced by the opaque lines 40a–40c will be angularly related to the electrodes. Nevertheless, these shadows will also serve to significantly increase the resistance of the cell, thus causing a large amplitude drop in the output voltage $e_0$. The only requirement necessary for detection of the shadow is, that at some interval of time during relative traverse of the shadow 45 over the cell 20, a component of the shadow must cut entirely across the exposed photoconductive material.

Those skilled in the art will appreciate that the exemplary apparatus 30 shown in FIG. 6 can be modified in many ways without departing from the spirit and scope of the present invention. For example, it would be entirely feasible to move the cell 20 about the light source 31 in order to detect stationary shadows. Of course, the shadow 45 could be produced by other than opaque lines inscribed on a film or other business document. For example, the shadow 45 could be produced by physical objects which are transported between the cell and the light source such, for example, as pins or pieces of pencil lead, thus making the present invention particularly applicable to counting of small objects for bulk packaging. Moreover, it will be appreciated that while the cell 20 shown in FIG. 6 is sensitive to the presence of a shadow 45 produced when an opaque object is interposed between the light source 31 and the cell 20, the shadow need not be directly projected towards the cell but, rather can be formed by reflected light. Stated another way, the shadow producing object or indicia may be positioned on a carrier which will reflect more light than will the object itself, thus producing a reflected line of darkness on the cell which will effect a change in output signal.

While the novel photocell of the present invention has been described in connection with an exemplary photoconductive cell 20 such as that shown in FIG. 4, those skilled in the art will readily appreciate that the invention is also applicable to other types of photosensitive cells, for example, photovoltaic cells and photosensitive transistors.

It will be appreciated that there has been disclosed a novel photocell which is highly sensitive to the presence of a limited area shadow and which is capable of producing a change in output signal of significantly greater amplitude than has heretofore been possible. The detecting and signal generating apparatus is susceptible to a wide range of uses since it will sense the presence of objects producing shadows considerably smaller than the photosensitive surface area of the cell. Thus, the apparatus may be utilized in detecting thin opaque lines such as pencil lines on a paper. Moreover, the apparatus is not only sensitive to limited area shadows, but it will respond quicker and produce a signal of longer duration when subjected to a relatively moving shadow than has heretofore been possible with conventional photoconductive cells.

I claim as my invention:

1. Indicia detecting and signal generating apparatus comprising, in combination, a voltage source, a photoconductive cell having a pair of spaced electrodes and a broad exposed inter-electrode area of photosensitive material, said cell coupled to said voltage source, a light source spaced from said cell, a utilization device coupled to said cell and said voltage source, carrier means supporting said indicia intermediate said light source and said cell for projecting a shadow of limited area towards the latter, said carrier means positioned so that said projected shadow cuts entirely across said photoconductive material at some point intermediate said electrodes, and means for effecting relative movement between said carrier means and said cell so that said shadow traverses said cell.

2. Apparatus for detecting relatively thin opaque lines or the like and for generating signals in response to the presence thereof, comprising, in combination, a voltage source, a photocell having a pair of spaced electrodes and a broad exposed inter-electrode area of photosensitive material, said photocell coupled to said voltage source, a light source spaced from said photocell, a utilization device coupled to said photocell and said voltage source, carrier means having said thin opaque lines positioned thereon intermediate said light source and said photocell so that limited area shadows of the lines are projected toward the latter, and means for effecting relative movement between said carrier means and said photocell such that the shadows cast upon said detecting means by said lines traverse said photocell, said voltage source and said photocell being operable to produce and transmit a signal to said utilization device when shadows are detected by the photocell.

3. Indicia detecting and signal generating apparatus comprising, in combination, a light source, a voltage source, a photocell connected across said voltage source for detecting a limited area shadow and for producing an output signal representative of said shadow, said photocell being spaced from said light source and having a pair of spaced electrodes and a broad exposed inter-electrode area of photosensitive material, carrier means intermediate said photocell and said light source, shadow producing means positioned on said carrier means, said carrier means being positioned relative to said photocell so that said shadow producing means projects a shadow which cuts fully across the photocell at a point intermediate said electrodes, means for effecting relative movement between said carrier means and said photocell so that said shadow traverses said photocell, said source and said photocell serving to generate a change in output signal when said exposed photosensitive material senses any portion of said shadow cutting entirely thereacross at a point intermediate the electrodes, and a utilization device coupled to said source and said photocell for receiving said signal.

4. Object detecting and signal generating apparatus comprising, in combination, a voltage source, a photocell having a pair of spaced electrodes and a broad exposed inter-electrode area of photosensitive material, said photocell coupled to said voltage source, a light source spaced from said photocell, a utilization device coupled to said photocell and said voltage source, transparent carrier means for supporting said object intermediate said light source and said photocell, said carrier means being positioned relative to said photocell so as to project a shadow of the object towards said photocell with said shadow cutting entirely across the latter, means for effecting relative movement between said carrier means and said photocell so that said shadow traverses the latter, said photocell and voltage source being operable to generate a signal as the leading edge of said shadow cuts across the former, and means for conducting said signal to said utilization device.

References Cited by the Examiner
UNITED STATES PATENTS

| | | | |
|---|---|---|---|
| 2,668,867 | 2/54 | Eckstein | 250—211 X |
| 2,879,405 | 3/59 | Pankove | 250—211 |
| 2,896,086 | 7/59 | Wunderman | 250—211 |
| 2,945,959 | 7/60 | Atkinson | 250—237 |
| 2,953,690 | 9/60 | Lawson et al. | 250—211 |
| 3,033,073 | 5/62 | Shuttleworth | 250—211 X |
| 3,067,646 | 12/62 | Reesen | 88—14 |

RALPH G. NILSON, *Primary Examiner.*

WALTER STOLWEIN, *Examiner.*